May 14, 1940.  C. H. O'KOOMIAN  2,200,634
APPARATUS FOR MOLDING PLASTIC OBJECTS OF IRREGULAR SHAPE
Filed Jan. 12, 1937   6 Sheets-Sheet 1

Inventor
Charles H. O'Koomian
By Thomas A. Jenkins
Attorney

May 14, 1940. C. H. O'KOOMIAN 2,200,634
APPARATUS FOR MOLDING PLASTIC OBJECTS OF IRREGULAR SHAPE
Filed Jan. 12, 1937 6 Sheets-Sheet 2

Inventor
Charles H. O'Koomian
By Thomas A. Jenkins
Attorney

May 14, 1940.  C. H. O'KOOMIAN  2,200,634
APPARATUS FOR MOLDING PLASTIC OBJECTS OF IRREGULAR SHAPE
Filed Jan. 12, 1937   6 Sheets-Sheet 3

Inventor
Charles H. O'Koomian
By Thomas A. Jenks
Attorney

May 14, 1940.  C. H. O'KOOMIAN  2,200,634
APPARATUS FOR MOLDING PLASTIC OBJECTS OF IRREGULAR SHAPE
Filed Jan. 12, 1937    6 Sheets-Sheet 4

Patented May 14, 1940

2,200,634

UNITED STATES PATENT OFFICE 2,200,634

APPARATUS FOR MOLDING PLASTIC OBJECTS OF IRREGULAR SHAPE

Charles H. O'Koomian, Providence, R. I.

Application January 12, 1937, Serial No. 120,235

8 Claims. (Cl. 18—42)

My invention relates to improvements in the method of molding plastic articles of irregular shape and novel features of apparatus for use in carrying out said method.

While my invention is primarily adapted for use in molding any objects of irregular shape having holes therein from plastic material of the thermo-setting type, such as synthetic resins or the broader thermo-plastic type, including cellulose acetate, rubber, glass and other plasticizable materials, it is particularly adapted for molding valves for closure means for bottles, cans, containers and the like of the types shown in the joint application of Albert H. Church and James Rest, Ser. No. 751,734, filed November 6, 1934 for Nozzle closure means for containers, bottles, cans and the like and the application of Elton C. Church, Ser. No. 101,967 filed September 22, 1936 for Nozzle closure means for containers, bottles, tubes, cans and the like having dispensing holes therein.

My invention relates particularly to a novel method of molding articles of this description by providing pairs of lower molds having hemispherical or other irregularly shaped molding cavities in horizontal alignment and with channels in the upper surface of said molds leading from said cavities to the outer surface of said molds and rigidly mounting a vertically removable common pin rod between said aligned molds and cavities having branch pin means projecting therefrom through said mold channels and into said cavities, whereby after similar aligned pairs of molds having cooperating molding means thereon have been superimposed thereon to plasticize said objects under heat and pressure to the desired shape, the gang stripping of said objects from said molds may be readily accomplished by merely lifting up the common pin rod.

While I am aware that means have hitherto been employed to form holes in objects during the molding thereof, so far as I am aware these have been inserted through holes in the mold and have had to be withdrawn prior to stripping the objects from the molds. It is apparent that by inserting branch pin means connected to a common pin rod through open channels in the lower mold, the gang stripping of the objects and pin means is accomplished for the first time, and that the individual objects may be later stripped from the branch pin means by a gang stripping apparatus or method or individually, if desired.

A further object of my invention relates to improvements in the construction of molds for irregularly shaping objects having holes therein and also irregular projections therefrom, or cavities therein which have hitherto been impossible to remove from the molds. In molding objects such as the ball valve hitherto explained provided with axis of oscillation forming means or dimples diametrically thereof and a turning lug in a plane at right angles to said diametric axis, it has been extremely difficult to design a suitable mold and method of molding to provide irregular projections like said turning lug and irregular lugs or dimples like said axis of oscillation forming means and permitting the ready withdrawal of said articles from said molds. I have accomplished this by providing the horizontal mold line along the projections and forming vertical projections or depressions in the center of the hemi-spherical or other shaped molds to permit the objects to be readily lifted off said projections by moving them in a vertical line upwards. In other words, I have made molding of this type of object possible by arranging the spaced molding means so that the articles may be readily withdrawn therefrom in a vertical plane. In molding the type of turning lug of the type shown in said aforesaid application of Elton C. Church with concaved side walls to permit the insertion of the finger for the ready oscillation thereof, it has been particularly difficult to design a mold capable of molding such an article having a turning lug or other projection with such irregularly shaped side walls and I have accomplished this by running the horizontal mold line centrally through said turning lug so that the objects may be readily withdrawn from the mold by lifting them up. I thus believe that I have provided a novel type of mold which will permit this ready withdrawal of such irregularly shaped objects and particularly such objects having a hole therein as heretofore described.

A further object of my invention is to provide a novel method and apparatus for use in molding objects of irregular shape by so arranging the objects in the mold that the projections or indentations will either lie in a vertical plane or adjacent the horizontal mold line to permit the ready withdrawal of such molded objects from said lower mold by lifting them up vertically.

Further features of my invention relate to the improved construction of a four piece mold which I have shown herein for accomplishing the aforementioned results which is so designed to permit the ready gang removal of the objects from the lower mold and to effectively seal the outer ends of the channels in which said pin means lie during the molding operation, preferably by the specific construction of said pin rod and pin means and channels themselves.

Further features of my invention relate to further features of construction of the various molds and molding apparatus shown herein.

These and such other objects of my invention as may hereinafter appear will be best understood from a description of the accompanying drawings, which illustrate an embodiment thereof.

In the drawings.

In the drawings, wherein like characters of reference indicate like parts throughout, 20 generally indicates a multiple cavity mold for use in the gang manufacture of spherical valves and other objects of irregular contour in accordance with my invention.

It is apparent that the particular shape of the object may be varied by changing the contour of the molding means but that my invention is particularly adapted for use in molding objects of irregular shape, at least one molding cavity for each object having a groove or channel therein on the outer surface thereof to permit suitable pin means to lie in said channel during the molding operation so that after the other cooperating molding means is withdrawn therefrom, the articles may be stripped, preferably gang stripped, from their molding cavities by vertically raising the pin means around which the articles are molded from said channels or grooves. To accomplish such ready gang stripping, I preferably load the plasticizable material in pulverant or pellet form, or otherwise in aligned series of lower mold cavities having removable branch pin means projecting horizontally through the channels in the upper surface of the molds adjacent said cavities from a common pin rod interposed between said aligned pairs of cavities and vertically superimposed similarly aligned pairs of molds over said material in said cavities to subject said material to a plasticizing pressure under plasticizing conditions of heat to plasticize said material to mold said objects, remove said superimposed pairs of molds and vertically raise said common pin rod to gang strip said articles molded around said branch pin means from said lower mold cavities and if desired gang or otherwise strip said molded objects from said branch pin means to provide molded objects each having a hole therein. While any suitable type of material may be molded in accordance with the teachings of my invention, it is particularly adaptable for use in molding materials of the thermo-plastic or thermo-setting type, such as synthetic resins, cellulose derivatives, rubber, glass, etc.

Figure 26:
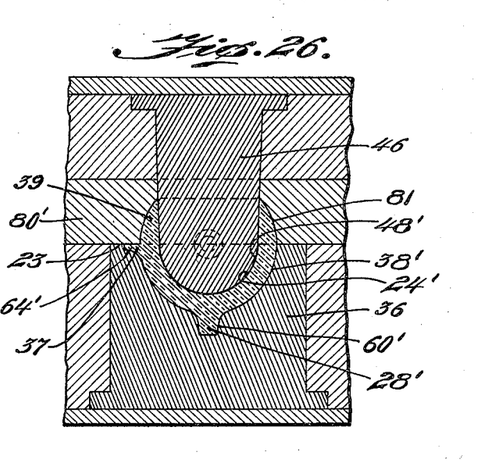
Fig. 26 is a sectional view of an apparatus employing this feature of my invention for molding a hollow valve having one projection therein substantially at the mold line, and a turning lug projecting therefrom located in a vertical plane so that the device may be readily vertically removed from the mold.
Figure 28:
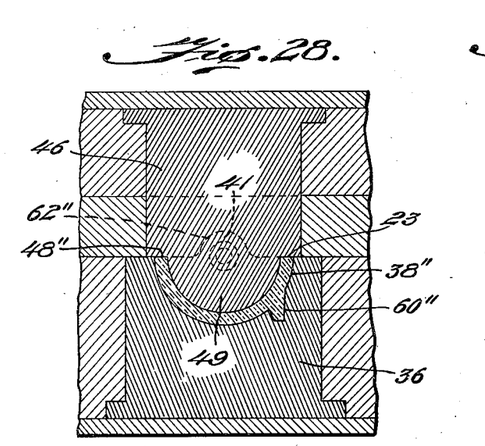
Fig. 28 is a sectional view of a further embodiment of a mold constructed in accordance with this feature of my invention wherein the object molded comprises a hollow hemi-spherical valve having projections projecting vertically therefrom to within the upper mold substantially at the mold line and a turning lug projecting vertically downwardly therefrom within the lower mold.

It is obvious that the shape of the objects depends on the construction of the molds, but for the gang stripping feature of my invention, it is apparent that one of the molds at least must comprise a cavity having an open channel leading thereto, and this aspect of my invention is only applicable for use in the manufacture of articles of irregular shape having a hole therein extending partially or entirely therethrough. Thus if it were desired to mold a hemi-spherical object, the surface of the mold not containing the hemi-spherical cavity would be substantially flat as shown in Fig. 28; if it were desired to mold a hollow hemi-spherically shaped object, the surface of the mold not containing the cavity would comprise a male projection as shown in Figs. 26 and 28.

My invention further relates to the molding of objects having a plurality of irregularly shaped cavities or projections therein in which the molds are so constructed and the articles so arranged in the molds that they may be withdrawn vertically therefrom.

Figure 16:
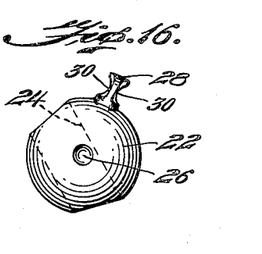
Fig. 16 is a side elevation of a valve constructed in accordance with the aforesaid Elton C. Church application which may be conveniently molded by my improved method and apparatus.
Figure 17:
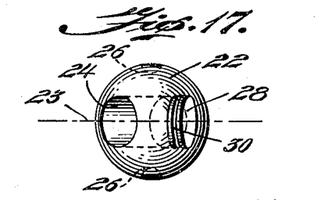
Fig. 17 is a plan view of such a valve.
Figure 18:
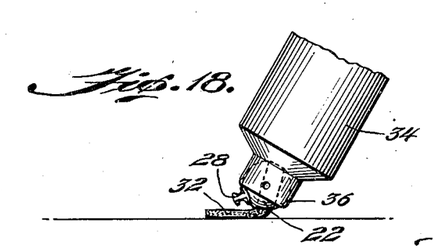
Fig. 18 is a side elevation of a collapsible tube provided with such a valve dispensing the paste therefrom and showing how with this improved construction the stream of paste readily flows from the tube free of the turning lug.

As illustrative of the type of irregularly shaped objects having a hole therein and also provided with irregular depressions and projections, I will describe the apparatus shown in the accompanying drawings adapted specifically for molding the improved type of hemi-spherical valve 22 illustrated in Figs. 16–18 provided with a dispensing hole 24 therein, the axis of oscillation forming means or dimples 26 formed diametrically thereof in a plane at right angles to that of said dispensing hole, which in this instance extends all the way through the valve and with the turning lug 28, which in this instance comprises a turning lug constructed in accordance with the teachings of the Elton C. Church application heretofore referred to and which has a turning lug having the concaved side walls 30 spaced at such an angle from the dispensing hole that in use, as shown in Fig. 18, the turning lug will not interfere with the dispensing of the paste 32 from the tube 34 in the nozzle 36 in which said turning valve is mounted in accordance with the teachings of the application of Albert H. Church and James Rest. It will be noted that this valve is a particularly hard object to mold, for it must be provided not only with the preferably off-center dispensing hole 24 therein, but also with the diametric axis of oscillation forming means or dimples 26 in a plane at right angles thereto and with the turning lug 28 provided with the concaved side walls 30 in the same plane as said dispensing hole 24 but spaced the proper distance therefrom. The problem of removing an object having a projection having concaved side walls from a mold was particularly difficult, and in this instance I have drawn the horizontal mold line between the molds half way along the surface of the lug so as to mold the lower hemi-spherical half in a lower mold cavity and the upper hemi-spherical half in an upper mold cavity so that the turning lug 28, even with the concaved side walls 30, may be readily withdrawn from the molds, and I have provided said hemi-spherical cavities with projections centrally thereof extending vertically therein to form the dimples 26 in said valve and yet permit the ready vertical withdrawal of said valve from said molds and I have mounted the pin means for forming the dispensing hole 24 along the horizontal mold line 23 so that the valve may be withdrawn, within the suitable mold channel leading from the lower mold cavity to the exterior of the mold, it being obvious if different shaped objects having either holes or irregular cavities or projections therein were desired to be molded, the mold would be similarly designed to permit the ready vertical removal thereof therefrom.

Insofar as the broader aspect of my invention is concerned, for the ready gang stripping of the molded objects from the mold I preferably provide aligned pairs of lower molds 36 having substantially hemi-spherical or other irregularly shaped molding cavities 38 therein and channels 40 in the upper surfaces of said molds leading to said cavities from the outer surface of each mold 36. I also provide a vertically removable common pin rod 42 adapted to be interposed between said aligned pairs of molds 36 and mold cavities 38 having branch pin means 44 projecting therefrom through said mold channels 40 and into said cavities 38. I also provide vertically superimposable similarly aligned pairs of molds 46 having cooperating hemi-spherical or other irregularly shaped molding cavities 48 therein and the channels 50 in the lower surface of said molds leading to said cavities from the outer surface of each mold, it being obvious, however, as hitherto stated, that the shape of the upper or opposite mold 46 depends on the nature of the object to be molded, and if it is desired to mold a hemi-spherical object, the mold surface 48 would be flat as suggested in Fig. 28 and if a hollow article, the molding surface 48 would be shaped in the form of a male projection as shown in Figs. 26 and 28. When molding objects such as the improved valves 22 having the dimples 26 therein, said cavities 38 and 48 in the ends of said lower and upper molds 36 and 46 may each be provided with dimple forming projections 60 and 62 respectively located centrally thereof to project vertically therein, or if not located centrally thereof or for the purpose of forming other recesses or projections from said object, located in a vertical plane, as shown in Figs. 26 and 28, to permit the ready vertical withdrawal of the molded objects or pin means therefrom. In the embodiments shown, to construct the turning lug 28, each of said molds 36 and 46 adjacent said mold cavities 38 and 48 is provided with hemi-turning lug or other projection forming cavities 64 and 66 respectively projecting therefrom within the mold, each of equal depth in each cavity so that the mold line will extend midway of said turning lug to permit the ready vertical withdrawal from said molds of said objects on merely lifting up said common pin rod 42.

In the drawings, I have shown a preferred type of four piece mold 20 particularly adapted for use with my improved pin rod 42 for molding said objects of irregular shape of the type hitherto described and permitting the use of said pin rod as one of the parts thereof for the ready withdrawal of said pin rod and objects from said molds. Said mold includes the bottom multiple plug or follower plate 68 having the aligned pairs 70 of bottom plugs 36 projecting vertically upwardly therefrom. While said molds or plugs 36 are preferably detachably mounted on the plate 68 as shown in section in Figs. 3 and 4, they may if desired be rigidly mounted thereon as followers or part of the plate. In the improved construction shown, the bottom plate 68 is provided with the cover 74 underlying the lower ends of the plugs 36 and detachably securable to the bottom of the plate 68 by the screws 76. In the preferred embodiment shown, as hitherto explained, each plug is provided with a substantially hemispherical molding cavity 38 therein and the semicircular pin groove means 40 aligned with similar pin groove means 40 in its respective pair plug in the upper surface thereof, in the embodiment shown, two pin groove means 40 located diametrically of each plug cavity 38 so that the branch pin means 44 may extend diametrically on each side of said cavity to provide the dispensing hole 24 extending entirely through each object.

Figure 3:
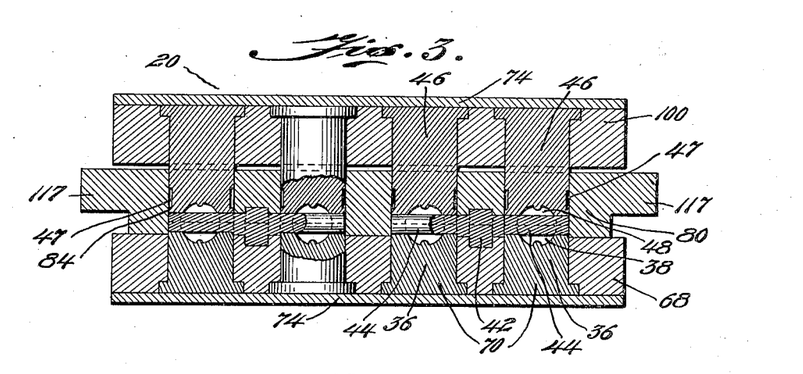
Fig. 3 is a vertical sectional view taken along the line 3—3 of Fig. 2.
Figure 4:
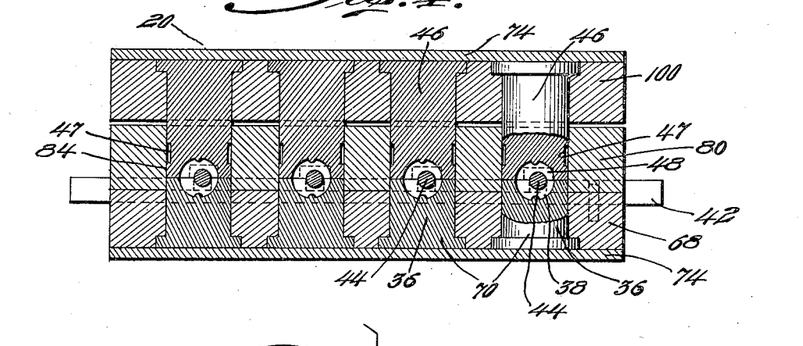
Fig. 4 is a vertical sectional view taken along the line 4—4 of Fig. 2.
Figure 5:
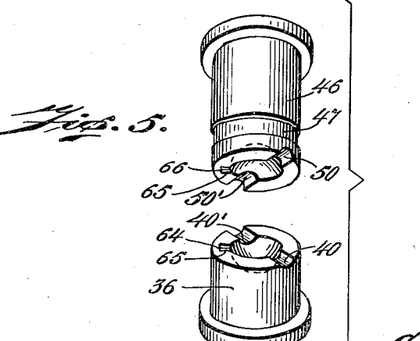
Fig. 5 is a disassembled perspective view illustrating a single upper mold plug or follower about to be superimposed over a single lower mold plug or follower.
Figure 6:
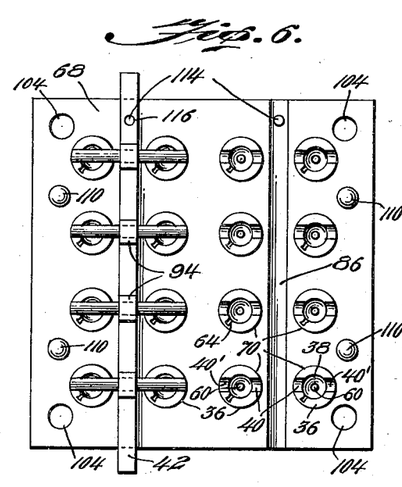
Fig. 6 is a plan view of the bottom multiple plug plate I preferably employ and showing a pin rod I preferably employ therewith in one channel thereof.
Figure 7:
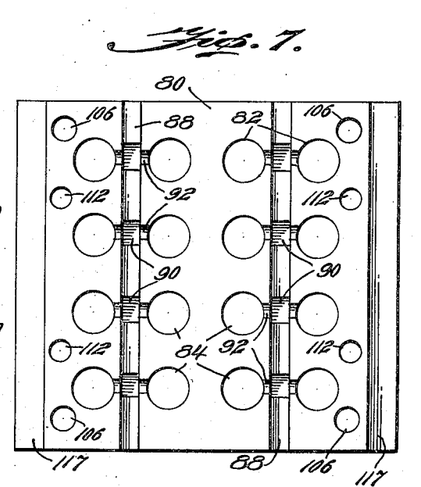
Fig. 7 is a reverse plan view of the loading plate.
Figure 8:
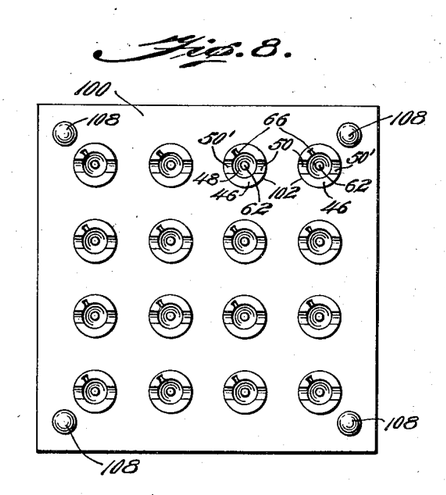
Fig. 8 is a reverse plan view of the multiple plug top plate.
Figure 9:
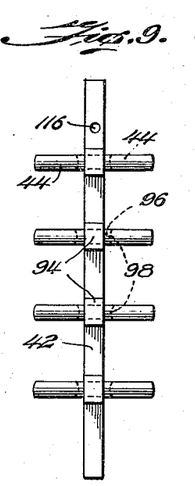
Fig. 9 is a plan view of the improved type of pin rod I preferably employ.
Figure 10:
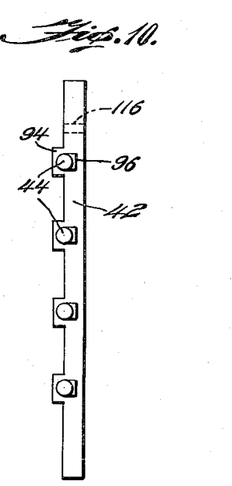
Fig. 10 is a side elevation of the pin rod shown in Fig. 9.

To facilitate the loading of my improved mold with pulverant plasticizable material 78 (Fig. 11), I provide the relatively movable loading plate 80 having an equal number of similarly located pairs 82 of loading holes 84 containing as shown in Figs. 3 and 4 the upper ends of said plugs 72 in the lower portion thereof.

To accurately align said pin rod 42 and its pin means 44 in the desired channels 40, I provide said plug plate 68 on the upper surface thereof and said loading plate 80 on the lower surface thereof, between said respective aligned pairs 70 of plugs 36 and pairs 82 of holes 84, with the respective complemental, preferably rectangular channels 86 and 88 extending horizontally thereof. To insure that the proper pin means 44 will extend into the proper pin grooves of each respective pair plug, I have provided said loading plate channel 88 with rectangular registering depressions 90 therein opposite said respective plug grooves 40 and with branch semi-cylindrical channels 92 therein opposite each respective plug groove 40 and hole 84 for receiving the upper cylindrical half of each respective cylindrical pin means 44 therein.

In my preferred embodiment, the pin rod 42 comprises a substantially rectangular shank 42 contained within said channels 86 and 88 and hence between said plug plate 68 and loading plate 80. Said shank 42 is provided intermediate said opposite branch pin means 44 with rectangular registering and sealing lugs 94 projecting upwardly therefrom to fit in said rectangular registering depressions 90, and as stated said pin rod is provided with circular pin means 44 branching at right angles in opposite directions therefrom adjacent each respective mold groove 40 and channel 92 fitting within said semi-cylindrical branch channels 92 in said loading plate 80 and extending through said plug grooves 40 and into said cavities 38, in the preferred embodiment extending through said cavities and into the pin groove 40' diametric of each cavity of said inner pin groove 40 to provide the dispensing hole 24 extending entirely through the molded valve or object. Each respective branch pin means 44 is provided, as shown, with rectangular sealing lugs 96 projecting downwardly from substantially the lower central circumference thereof and terminating in concaved outer ends 98 adapted to abut the lower plug walls.

I also provide a relatively movable top multiple plug plate 100 having similarly aligned pairs 102 of plugs 46 projecting vertically downwardly therefrom through said respective loading plate holes 84 and into contact with the upper surface of said lower plugs 36. As stated hitherto, in the embodiment shown the lower surface of each upper plug 46 is provided with cooperating semicylindrical groove means 50 in the lower surface thereof, in the preferred embodiment with an additional groove means 50' diametric of said inner groove means 50 adjacent said pin rod 42 aligned with similar groove means 50 and 50', if employed, in the adjacent pair plug cavity. As hitherto explained, said cavities 38 and 48 are provided with similarly aligned hemi-turning lug or other projection forming cavities 64 and 66 in the abutting plug surfaces thereof adjacent said cavities, in the preferred embodiment shown each provided with convex side walls 65 shown.

Supplemental cooperating means are provided on said plate and rod to keep the respective cavities or molds in alignment during the pressing or molding operation and in the preferred embodiment shown, the lower plate 68 is provided with the holes 104 in each corner thereof, and the loading plate 80 is provided with similarly aligned holes 106 in each corner thereof to receive the pin means 108 projecting downwardly from said upper plate to keep said plates in alignment. If desired, supplemental means such as the pins 110 projecting upwardly from the bottom plate fitting into cavities 112 in the loading plate may be provided to keep the pin rods in alignment so that each respective branch pin 44 thereof will lie in the proper pair groove of each pair plug. In addition to the projections 94 from the pin rod 42 and the cooperating depressions 90 in the loading plate channel 88, I may provide the pins 114 projecting upwardly from said lower plug plate channel 86 adapted to register in suitable holes 116 in the pin rod shank 42 for this purpose. It is also apparent that with the rectangular formation of said pin rod shank 42 and said cooperating channels 86 and 88, said projections 94 and said depressions 90 tend to additionally keep the parts of my invention from relative turning movement in use as well as provide alignment of the cylindrical branch pin means 44 within the semi-cylindrical grooves 40 and 50 of said cooperating upper and lower sets 70 and 102 of plugs 36 and 46. As stated hitherto, the molds 46 are preferably mounted in the upper plug plate as detachable plugs 46, detachable on removal of its respective plate 74 and holding screws 78. They may be integrally mounted in said plate as permanent followers if desired. For a reason to be explained, the side walls of the loading plate have their upper ends extending laterally a substantial distance as at 117.

Figure 1:
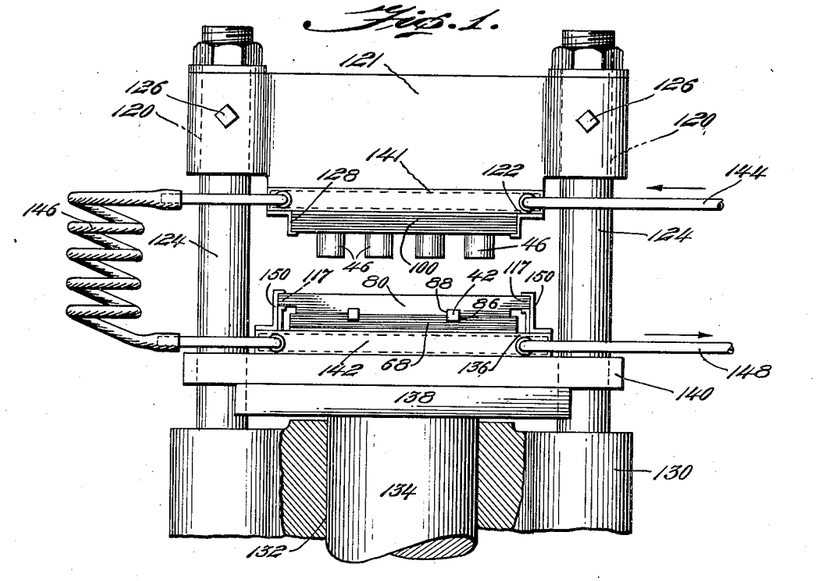
Fig. 1 is a side elevation of a suitable type of hydraulic mold for molding objects in accordance with my invention.
Figure 2:
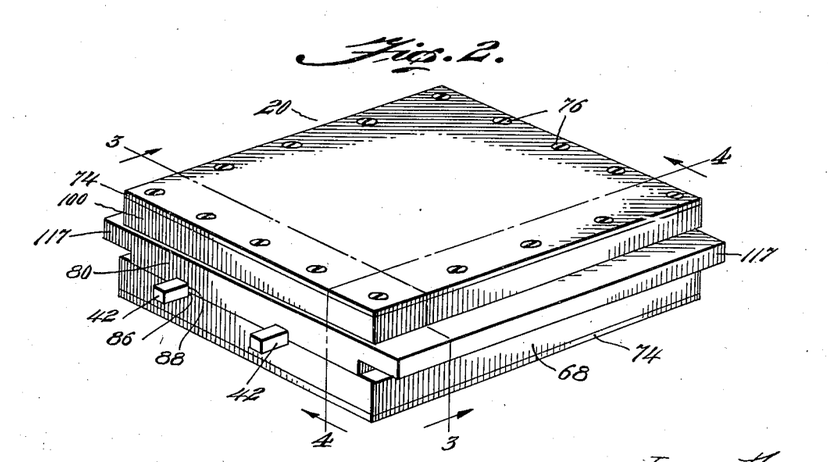
Fig. 2 is a perspective view of my improved four-piece mold.

I have illustrated in Fig. 1 a suitable type of press for holding my improved mold. Said press is provided with the upper push back 121 having vertical holes 120 in the end extensions thereof for rigid mounting on the gude rods 124 by means of the bolts 126. The top plate 100 may be detachably secured to the push back surface 122 by means of the clamps or slidable L-bars 128. The guide rods 124 are rigidly mounted on the frame 130 containing a central hole 132 for receiving the hydraulic ram 134 on which is mounted the surface 136 for receiving said bottom plate 68 thereon, said surface 136 forming the upper surface of the piston or ram head 138 having the guide holes 140 in the ends thereof for vertical movement relative to the stationary upper plate 100 rigidly mounted as explained on the upper push back 121. Suitable steam chambers 141 and 142 are provided in the push back 121 and piston 138 for receiving steam to supply the necessary molding heat for plasticizing purposes, for this purpose steam being led to the chamber 141 by the pipe 144 and led to the chamber 142 in the piston 138 by the expansible coil 146 and discharged from said lower chamber 142 by the pipe 148. The bottom plate is mounted on the piston surface 136, has the pin rods 42 mounted in the suitable channels 86 therein and the loading plate 80 superimposed thereon, the upper surfaces of the pin rod shanks 42 fitting into the channels 88 thereof. The loading plate 80, pin rod 42 and lower plate 68 are then rigidly secured to said piston surface 136 by the clamps or slidable L-bars 150, said slidable L-bars overlapping the projecting ends 117 of the loading plate 80.

Figure 11:
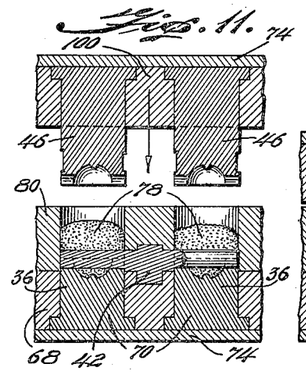
Figs. 11–13 are sectional views taken through a portion of my invention along two cooperating pairs of plugs and illustrating in Fig. 11 the plastic material in powder form inserted within the lower plug molding cavities and loading plate holes, in Fig. 12 during the actual molding operation with the upper plugs superimposed on the lower plugs, and in Fig. 13 after the parts of my improved molding apparatus have been moved from each other and the pin rod relatively vertically raised from the lower plug cavities simultaneously stripping the objects therefrom.
Figure 12:
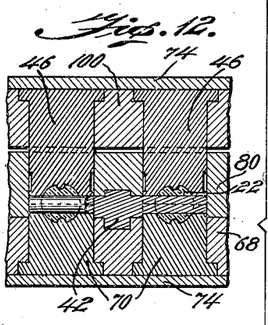

When the parts have assumed the position shown in Figs. 1 and 11, the material, preferably in pulverant or pellet form 78, is loaded within the cavities 38 and holes 82 in the loading plate and the ram 134 is operated to raise the lower plug plate 68 and the loading plate 80 into contact with the top plug plate 100 to cause the upper surface of the loading plate to abut the lower surface of the top plug plate and the upper surface of each bottom plug to abut the lower surface of each top plug, at which time the necessary plasticizing heat may be applied by means of the steam chambers 141 and 142 and the pressure on the ram 134 increased to compress said plugs together to the desired molding pressure. Particularly in the early stages of molding, as the pulverant plastic 78 becomes liquid, it is apt to cause the pin rod 42 to temporarily rise upwardly in temporary surges and it is for this purpose that I have provided each branch pin means 44 with the depending rectangular sealing lug 96 projecting downwardly from substantially the semi-circumference thereof terminating in the concaved outer end 98 abutting said lower plug wall so that as material tends to ooze out along the lower portion of the grooves 40, the ends 98 of the sealing lugs 96 will tend to rise up and continue to prohibit its oozing out. Similarly do the projections 94 seal and prevent liquid from oozing out from the upper semi-cylindrical grooves 50 of the upper plugs 46 and in general the pin rod is constructed of rectangular shank formation for this supplemental sealing purpose. If desired, instead of providing the registering projections or lugs 94, the entire upper surface of the pin rod may be raised flush therewith to provide a sealing surface, and it is thus obvious that with this construction, said pin rods 42 and channels are shaped to tend to seal the inner ends of said grooves 40 and 50 in use. To prevent plastic material from riding up on the outer surfaces of the upper plugs, said plugs are provided with the circumferential grooves 47 spaced from the lower ends thereof to act as reservoirs to contain such forced up plastic material.

Figure 13:
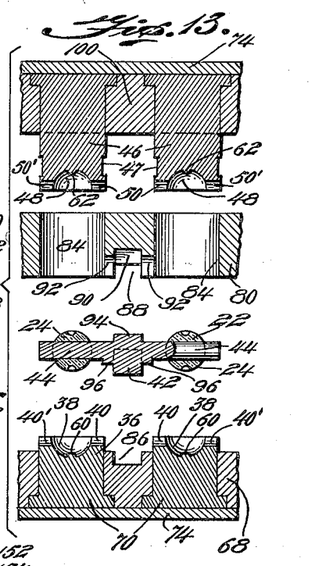
Figure 14:
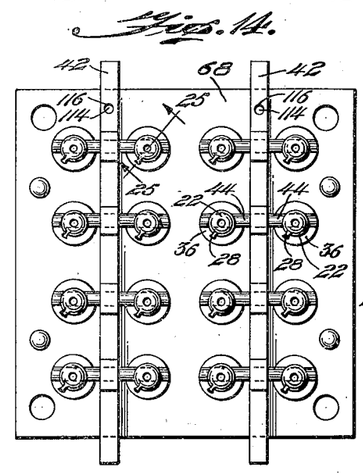
Fig. 14 is a plan view of the bottom plug plate and pin rods with the plastic objects molded thereon after the top plug plate and loading plate have been withdrawn therefrom.
Figure 15:
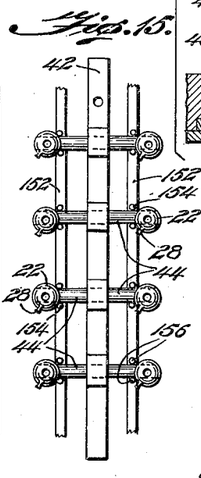
Fig. 15 is a plan view illustrating how the molded valves or other objects may be conveniently gang stripped from the branch pin means of the pin rod.

After the pulverant material 78 has been subjected to the desired plasticizing pressure and temperature for the desired period of time to plasticize said articles, the time, temperature and pressure depending on the size of the articles to be plasticized and the materials used, the hydraulic ram 134 is lowered, causing the ram piston head 138 to withdraw from the upper plug plate 100 carrying the loading plate 80, pin rods 42 and lower plate 68 with it. When they have been lowered the desired amount, the clamps 150 are unloosened, the loading plate 80 is lifted from the lower plug plate 68, free of the lower plugs and as shown in Fig. 13 the pin rod 42 is raised vertically carrying the molded objects 24 with it, the dimple cavities 26 readily moving vertically free of the respective projections 60 in said cavities 38 and the turning lugs 30 readily moving out of their respective cavities 64, the objects being previously removed from the upper cavities 48 on the lowering of the ram 134. Then as shown in Fig. 15, the pin rod 42 is suitably held rigidly or otherwise, and the individual articles 22 may be individually or gang stripped from each individual branch pin means 44. In the embodiment shown in Fig. 15, the individual objects 22 are gang stripped from the pin means 44 on each side of said pin rod 42 by the plate 152 having the pairs 154 of spaced pins 156 projecting upwardly therefrom adapted to straddle each side of the respective pin means 44 and on outward pressure being exerted on said plate 152 away from said pin rod 42 may all the molded objects be simultaneously gang stripped from their respective branch pin means 44.

Figure 19:
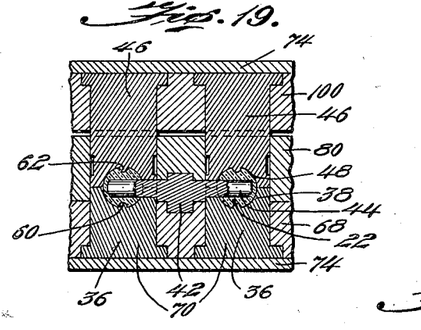
Fig. 19 is a sectional view similar to Fig. 12 showing a modified form of pin means not extending completely through the molds to form valves or other objects having holes therein not extending completely therethrough.
Figure 20:
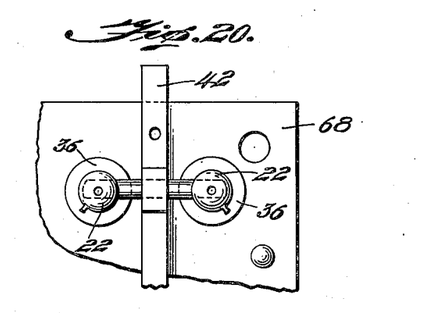
Fig. 20 is a plan view of a portion of the embodiment of my apparatus shown in Fig. 19.
Figure 21:
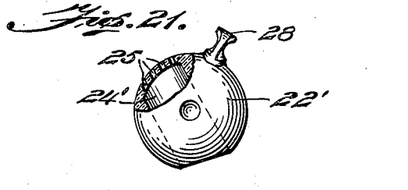
Fig. 21 is a side elevation of a valve partially broken away and shown in section constructed on the embodiment of molds shown in Figs. 19 and 20 having perforations between the main hole and the outer surface thereof.
Figure 22:
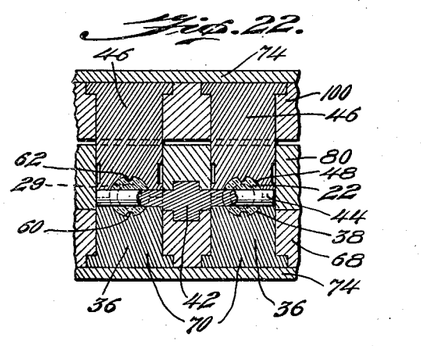
Fig. 22 is a sectional view similar to Fig. 19 in which the sides of the mold cavities may be further varied to provide a non-spherical valve or one provided with a supplemental hole or channel therein.
Figure 23:
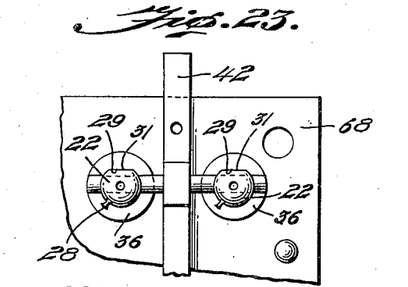
Fig. 23 is a plan view of a portion of the modified form of my invention shown in Fig. 22.
Figure 24:
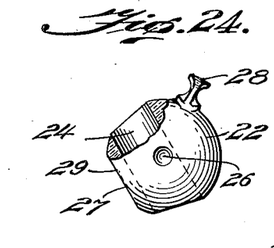
Fig. 24 is a side elevation partially broken away of a valve constructed with the embodiment of molds illustrated in Figs. 22 and 23.

As stated hitherto, the shape of the articles to be molded may be varied by varying the shape of the upper and lower mold cavities 38 and 48. The shape of the hole means 24 may also be varied by varying the shape of the branch pin means 44, thus if tapered holes 24 be desired in the valves 22 or other objects, the branch pin means 42 may be tapered for this purpose. If it be desired to form a hole 24' as shown in Fig. 21 not extending all the way through the valve, the diametric channels 40' and 50' may be omitted and the branch pin means 44 terminate at a distance from the diametric sides of the cavities as shown in Figs. 19—20. The perforations 25 as shown in Fig. 21 may be either bored after stripping of the valves from the branch pin means or the ends of the branch pin means may be provided with miniature rods for forming such holes 25. I have shown in Figs. 22—23 a valve provided with a flat supplemental channel 27 in the side wall thereof which may be used as an inlet 27 in use. As shown in Fig. 23, such a channel may be made by flattening the walls 31 of the cavities 38 and 48 for this purpose to leave the flat segmental surface 29 formed by the theoretical removal of a segment from the substantially spherical valve shown in the other figures.

Figure 25:
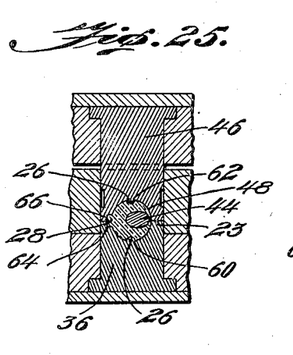
Fig. 25 is a sectional view taken along the line 25—25 of Fig. 14 through a turning lug of a formed valve or other object illustrating how the type of object shown herein may be molded in accordance with my invention by locating a certain respective projection or depression, such as a turning lug, along the horizontal mold line of the valve or object and any other irregularity, such as the axis of oscillation forming projections or dimples, located diametrically in a vertical plane so that a valve having such irregular depressions or projections therein may be readily withdrawn from the mold in a vertical plane.

As also previously pointed out, an important feature of my invention consists in not only changing the shapes of the objects to be molded but also so locating the projections or depressions on an irregular object either at the horizontal moldline and/or in a vetrical plane to permit the vertical withdrawal of the molded valves or other objects from the molds. For this purpose, I have shown in Fig. 25 a sectional view taken through a single mold through the turning lug 28, through the respective turning lug cavities 64 and 66, to illustrate how these are located at substantially the horizontal mold line 23 between the upper and lower molds 46 and 36 and how the dimple forming projections 60 and 62 are located in said cavities 38 and 48 in a vertical plane to permit the valves 22 to be vertically withdrawn from the mold cavities 38 and 48, the lug 28 vertically wthdrawing from the mold cavities 66 and 68 and the valve 22 vertically withdrawing from the vertically extending dimple forming projections 60 and 62 in said respective mold cavities 38 and 48 to provide the dimples 26 in said valve 22. As illustrated in Fig. 25, a mold constructed to permit the vertical withdrawal of the objects therefrom may be employed for the gang stripping features of my invention. I have shown in Figs. 26—31 embodiments of my invention employing this feature thereof without the gang stripping feature thereof, although the objects shown in Figs. 26—31 can be made on molds to be capable of being gang stripped. I have shown in Fig. 27 a hollow partially spherical valve 22' in which the hole 24' does not extend all the way through, and which in addition to the main turning projection 28' has a suplemental turning projection or stop 37. As shown in Fig. 26, to provide the hollow cavity 24' in said valve, the upper plug or follower 46, instead of being provided with a cavity 48, is provided with a male projection or punch 48'. The lower plug 36 is provided with the hemi-spherical cavity 38' as usual, but instead of being provided with a lower dimple forming projection 60 is provided with a lug forming recess 66' to shape the turning lug 28'. The lower mold cavity 38 is also provided with a supplemental cavity 64' capable of forming the entire supplemental lug 37 therein substantially at the mold line 23 to permit the ready vertical withdrawal of the valve from the mold.

Figure 27:
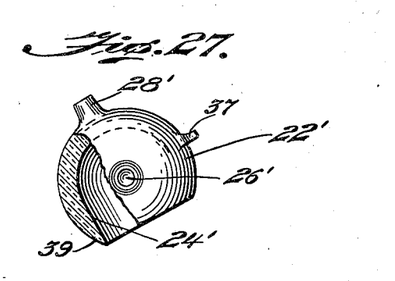
Fig. 27 is a side elevation partially shown in section of a hollow valve molded on the mold shown in Fig. 26 having a vertical turning lug and a supplemental turning lug also projecting therefrom in a horizontal plane.

As shown in Fig. 26, the loading plate 80' is provided with a supplemental cavity 81 to permit the formation of the lower end 39 of the wall of the valve 22' shown in Fig. 27. If desired, however, the entire upper plug or follower may be shaped with the annular cavity 81 having the projection 48' therein in place of locating the cavity 81 in the loading plate 80. It is thus apparent that with this construction a projection 37 is formed substantially at the mold line 23 and a vertical projection 28' is formed in the composite mold to permit the vertical withdrawal of the hollow valve from said mold.

Figure 29:
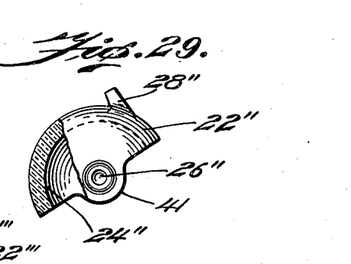
Fig. 29 is a side elevation partially shown in section of a hollow hemi-spherical valve molded in accordance with the embodiment of my invention shown in Fig. 28.

I have shown in Figs. 28-29 a further modification of my improved mold to accomplish such a purpose. In this instance, the upper plug or follower 46 has a main flat lower surface 48'' provided with diametrically spaced cavities 62'' vertically therein and a central male portion 49. The lower plug 36 is provided with the usual lower mold cavity 38'' also provided with a supplemental vertically extending turning lug cavity 66'' therein, in this instance, however, said cavity being located offset from the center of said main mold cavity 38''. It is thus obvious that the hollow substantially hemi-spherical valve shown in Fig. 29 may be readily molded in the apparatus shown in Fig. 28, said valve 22'' having the hollow hole 24'' therein formed by the vertical male projection 49 from the upper mold 46, the turning lug 28'' projecting vertically from one side thereof formed in the vertically projecting cavity 60'' in said lower mold cavity 38'', and the wall extensions 41 projecting vertically upwardly therefrom formed by vertical cavities 62'' in the upper mold member 46. The diametric axis of rotation forming dimples 26' and 26'' are preferably bored in the walls of the hollow valves after they are molded. If desired, the hollow holes 24'' may be molded therein by the ends of the branch pin means 44 for gang stripping in a modified type of the apparatus shown in Figs. 1-24, and the dimples 26'' suitably molded therein, and projections 28'' and 41 molded therein along the horizontal mold line 23. I have shown in Figs. 30 and 31 a further embodiment of my improved mold to accomplish such a purpose to form a relatively cheaper type of hollow valve, shown in Fig. 31, than that shown in Figs. 27 and 29, in this instance comprising a partially hemi-spherical valve somewhat between a quarter- and hemi-sphere with axis of oscillation forming dimples 26''' formed at substantially the center thereof and comprising in this instance semi-circular holes and a turning lug 28''' projecting vertically upwardly substantially centrally thereof. In this instance the upper surface of the lower mold 36 is cut away as at 200 to permit the projections 202 from the upper mold 46 to project therein on each side thereof amounts substantially half the amount that said hemi-spherical valve 22''' is less than a hemisphere to limit the wall of the valve 22' to the desired size. The upper plug or mold 46 is provided with a like central male partially spherical portion 49 of the approximate size of the interior of the valve 22'''. The lip 204 in the male member adapted to form the upper edge of the wall of the valve 22''' inclines radially upwardly to the mold line 23 on opposite diametric sides thereof and the upper mold is provided with the diametrically located downwardly extending projections 206 adapted to fit into diametric depressions 208 in said lip 204 to form the partially spherical holes or axis of oscillation forming means 26''' diametrically thereof. The lower plug 36 is provided with the usual lower mold cavity 38''' provided with the lip 204 hitherto explained with a supplemental vertically extending turning lug cavity 66''' therein. It is thus obvious that the hollow partially spherical valve shown in Fig. 31 may be readily molded in the apparatus shown in Fig. 30, said valve having the hollow hole 24''' therein comprising its interior formed by the vertical male projection 49 from the upper plug or mold 46, the turning lug 28''' projecting vertically thereof formed in the vertically projecting cavity 60''' in said lower mold cavity 38''' and the diametric dimples or partially circular holes 26''' therein substantially at the mold line between the upper and lower mold. It is also apparent that the embodiment of molds shown in Figs. 28 and 30 have a projection or cavity therein located substantially at the horizontal mold line and another projection or cavity therein extending in a vertical plane to also permit the ready withdrawal of the molded article therefrom in a vertical plane.

Figures 30, 31:
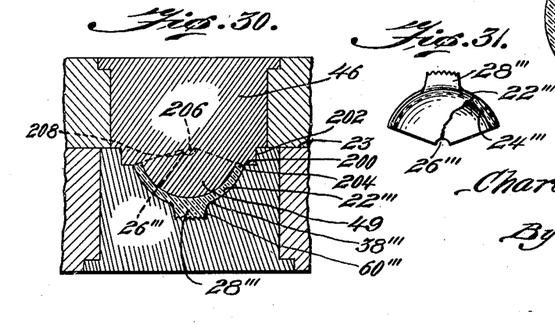
Fig. 30 is a sectional view of a further embodiment of a mold constructed in accordance with this feature of my invention, wherein the object molded comprises a hollow partially spherical valve in between a quarter and a hemisphere arranged so that the center of the sphere will lie substantially at the mold line so that the diametric axis of oscillation forming dimples may be provided therein by projections from the upper mold substantially at the center thereof and the turning lug may project vertically downwardly therefrom within the lower mold.
Fig. 31 is a side elevation partially shown in section of a partially spherical valve molded in accordance with the embodiment of my invention shown in Fig. 30.
Figure 32:
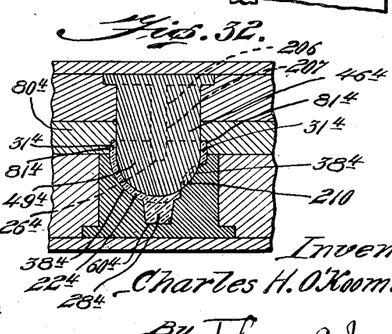
Fig. 32 is a sectional view of a further embodiment of a mold constructed in accordance with this feature of my invention wherein the object molded comprises a hollow, partially spherical valve slightly more than a hemisphere arranged so that the center of the sphere will lie substantially at the mold line, so that the diametric axis of oscillation forming slits may be provided therein by elongated diametric projections from the upper mold passing through cooperating slits in the loading plate thereof and a turning lug may project vertically downwardly therefrom within the lower mold.
Figure 33:
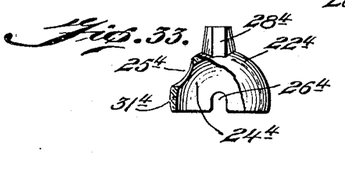
Fig. 33 is a side elevation partially shown in section of a partially spherical valve molded in accordance with the embodiment of my invention shown in Fig. 32.

I have shown in Figs. 32 and 33 a modified form of the embodiment of my improved mold shown in Figs. 30 and 31 to form a suitable type of valve for use in a collapsible tube, in this instance comprising a partially spherical valve slightly greater than a hemisphere with axis of oscillation forming slits 26⁴ projecting vertically upwardly substantially centrally thereof. The upper plug or mold 46⁴ is provided with a central male projection 49⁴ having a hemispherical end and permitting the side wall 31⁴ of the valve to project above the mold line vertically of the side wall of said male projection within the annular depression 81⁴ formed for this purpose in the loading plate 80⁴, and is provided with the diametrically located downwardly extending projections 206 adapted to extend through diametric slits 207 in the loading plate 80⁴ and within said female mold cavity 38⁴ to form the diametric axis of oscillation forming slits 26⁴ in said valve.

In addition, the female mold cavity 38⁴ is provided with the vertical projection 210 in a side wall thereof having vertical side walls to permit the withdrawal of the completed valve from the mold, it being obvious that said projection 210 forms the dispensing cavity 25⁴ in said valve 22⁴. The turning lug 28⁴ projects vertically upwardly from the completed valve 22⁴ and is formed by cooperating means in said mold in the same manner as the turning lugs 28' and 28'''. It is thus obvious that the hollow partially spherical valve 22⁴ shown in Fig. 33 may be readily molded in the apparatus shown in Fig. 32, said hollow valve having a hole 24⁴ comprising its interior formed by the vertical male projection 49⁴ from the upper plug or mold 46⁴, the turning lug 28⁴ projecting vertically thereof formed in the vertical cavity 60⁴ in said lower mold cavity 38⁴, the side wall 31⁴ projecting vertically upwardly from the mold line, said enlarged cavity 24⁴ having a dispensing hole 25⁴ formed therein as explained and the diametric slits 26⁴ formed therein substantially at the mold line diametrically of the hemispherical portion of said valve and extending upwardly through said side wall 31⁴. The outer surface of the wall 31⁴ is supplementary preferably rounded so that the valve may preferably oscillate within the tube. In this instance the slits 26⁴ are employed instead of the dimples 26 to permit the valve to be readily withdrawn from the mold and for a similar reason are the walls of the hole 25⁴ made vertical. It is also apparent that the embodiment of mold shown in Fig. 32 has a projection or cavity located therein substantially at the horizontal mold line and at least one other projection or cavity therein extending in a vertical plane to also permit the ready withdrawal of the molded article therefrom in a vertical plane.

I have illustrated various modifications of the shape of the molds and pin means in Figs. 19–33, such modifications being merely illustrative but not exhaustive of types of irregularly shaped articles or valves which may be made employing the principles of my invention.

In place of providing pairs of molds, with branch pin means 44 projecting into each cavity, it is obvious that one mold and corresponding branch pin means of each pair may be dispensed with, the gang stripping taking place from said pin rod and molds located in any desired manner adjacent thereto.

It is thus obvious that I have provided a novel method and apparatus for molding articles of irregular shape, preferably those adapted to have hole means therein molded around suitable pin means and including a novel method and means for gang stripping said articles 22 from said mold cavities and from said pin means and also a novel method and mold for molding articles of irregular shape having irregular surfaces or depressions or projections in said surfaces with the attendant advantages portrayed above.

While I have shown and described the preferred embodiments of my invention shown herein as applied to heat or thermo molding, it is apparent that certain features of my invention are applicable to pressure injection cold or otherwise or any other type of method or apparatus for molding plastic materials.

It is understood that my invention is not limited to the specific embodiments shown or methods described, and that various deviations may be made therefrom without departing from the spirit and scope of the appended claims.

What I claim is:

1. A multiple cavity mold for use in the gang manufacture of spherical valves and other objects of irregular contour, comprising a bottom multiple follower plate having aligned followers projecting vertically upwardly therefrom, each having a substantially hemi-spherical molding cavity therein, and semi-cylindrical pin groove means in the upper surface thereof diametrically of said cavity. a relatively movable loading plate having an equal number of similarly located loading holes containing said followers in the lower portion thereof, said follower plate having on the upper surface thereof and said loading plate having on the lower surface thereof adjacent said respective aligned followers and holes complemental rectangular channels extending horizontally thereof, said loading plate channel having rectangular registering depressions therein opposite said respective follower grooves, and branch semi-cylindrical channels projecting therefrom to each respective follower groove, a relatively movable pin rod comprising a substantially rectangular shank contained within said channels of and hence between said follower plate and loading plate and having rectangular registering and sealing lugs projecting upwardly therefrom to fit into said rectangular registering depressions and cylindrical pin means branching therefrom fitting within said semi-cylindrical branch channels in said loading plate and extending through said follower grooves and into said cavities, each having a rectangular sealing lug projecting downwardly from substantially the lower semi-circumference thereof terminating in a concave outer end abutting said lower follower wall and a relatively movable top multiple follower plate having similar aligned followers projecting vertically downwardly therefrom through said cooperative loading plate holes in contact with said lower followers, each having a similar cooperating substantially hemispherical molding cavity therein and semi-cylindrical groove means in the lower surface thereof diametrically of said cavity for receiving said pin means and cooperating means on said plates and rod to keep the respective cavities in alignment during the pressing operation, said cavities in the ends of said upper and lower followers each having dimple forming projections located centrally thereof to permit the vertical withdrawal of molded valves or objects therefrom and similarly aligned hemi-turning lug or other similar projection forming cavities, each having convex side walls projecting therefrom in the abutting follower surfaces thereof.

2. A multiple cavity mold for use in the gang manufacture of spherical valves and other objects of irregular contour, comprising a bottom multiple follower plate having aligned followers projecting vertically upwardly therefrom, each having a molding cavity therein, and semi-cylindrical pin groove means in the upper surface thereof diametrically of said cavity, a relatively movable loading plate having an equal number of similarly located loading holes containing said followers in the lower portion thereof, said follower plate having on the upper surface thereof and said loading plate having on the lower surface thereof adjacent said respective aligned followers and holes complemental rectangular channels extending horizontally thereof, said loading plate channel having rectangular registering depressions therein opposite said respective follower grooves, and branch semi-cylindrical channels projecting therefrom to each respective follower groove, a relatively movable pin rod comprising a substantially rectangular shank contained within said channels of and hence between said follower plate and loading plate and having rectangular registering and sealing lugs projecting upwardly therefrom to fit into said rectangular registering depressions and cylindrical pin means branching therefrom fitting within said semi-cylindrical branch channels in said loading plate, and extending through said follower grooves and into said cavities, each having a rectangular sealing lug projecting downwardly from substantially the lower semi-circumference thereof terminating in a concave outer end abutting said lower follower wall and a relatively movable top multiple follower plate having similar aligned followers projecting vertically downwardly therefrom through said cooperative loading plate holes in contact with said lower followers, each having a similar cooperating molding cavity therein and semi-cylindrical groove means in the lower surface thereof diametrically of said cavity for receiving said pin means and cooperating means on said plates and rod to keep the respective cavities in alignment during the pressing operation.

3. A multiple cavity mold for use in the gang manufacture of spherical valves and other objects of irregular contour, comprising a bottom multiple follower plate having aligned followers projecting vertically upwardly therefrom, each having a molding cavity therein, and pin groove means in the upper surface thereof, a relatively movable loading plate having an equal number of similarly located loading holes containing said followers in the lower portion thereof, a relatively movable pin rod comprising a shank having flat upper and lower surfaces contained between said follower plate and loading plate and having pin means branching therefrom extending through said follower grooves and cavities, and a relatively movable top multiple follower plate having similarly aligned followers projecting vertically downwardly therefrom through said cooperative loading plate holes in contact with said lower followers, each having a similar cooperating molding cavity therein and groove means in the lower surface thereof for receiving said pin means and cooperating means on said plates and rod to keep the respective cavities in alignment during the pressing operation, whereby upon removal of said top follower plate and loading plate from said bottom follower plate, said molded objects may be simultaneously raised from said bottom followers by lifting up said pin rod.

4. A multiple cavity mold for use in the gang manufacture of spherical valves and other objects of irregular contour, comprising a bottom multiple follower plate having aligned followers projecting vertically upwardly therefrom, each having a molding cavity therein, and pin groove means in the upper surface thereof, a relatively movable pin rod comprising a shank contained above said follower plate and having pin means branching therefrom extending through said follower grooves and cavities, and means thereon to abut the adjacent follower walls adjacent the mold line to prevent leakage during the molding operation and a relatively movable top multiple follower plate having similar aligned followers projecting vertically downwardly therefrom in contact with said lower followers, each having a similar cooperating molding cavity therein and groove means in the lower surface thereof for receiving said pin means and cooperating means on said plates and rod to keep the respective cavities in alignment during the pressing operation, whereby upon removal of said top follower plate from said bottom follower plate, said molded objects may be simultaneously raised from said lower followers by lifting up said pin rod.

5. A multiple cavity mold for use in the gang manufacture of spherical valves and other objects of irregular contour, comprising a bottom multiple follower plate having aligned followers projecting vertically upwardly therefrom, each having a molding cavity therein, and semi-cylindrical pin groove means in the upper surface thereof diametrically of said cavity, a relatively movable loading plate having an equal number of similarly located loading holes containing said followers in the lower portion thereof, said follower plate having on the upper surface thereof and said loading plate having on the lower surface thereof adjacent said respective aligned followers and holes complemental rectangular channels extending horizontally thereof, said loading plate channel having rectangular registering depressions therein opposite said respective follower grooves, and branch semi-cylindrical channels projecting therefrom to each respective follower groove, a relatively movable pin rod comprising a substantially rectangular shank contained within said channels of and hence between said follower plate and loading plate and having rectangular registering and sealing lugs projecting upwardly therefrom to fit into said rectangular registering depressions and cylindrical pin means branching therefrom fitting within said semi-cylindrical branch channels in said loading plate, and extending through said follower grooves and into said cavities, and a relatively movable top multiple follower plate having similar aligned followers projecting vertically downwardly therefrom through said cooperative loading plate holes in contact with said lower followers, each having a similar cooperating molding cavity therein and semi-cylindrical groove means in the lower surface thereof diametrically of said cavity for receiving said pin means and cooperating means on said plates and rod to keep the respective cavities in alignment during the pressing operation.

6. A multiple cavity mold for use in the gang manufacture of spherical valves and other objects of irregular contour, comprising a bottom multiple follower plate having aligned followers projecting vertically upwardly therefrom, each having a molding cavity therein, and semi-cylindrical pin groove means in the upper surface thereof diametrically of said cavity, a relatively movable loading plate having an equal number of similarly located loading holes containing said followers in the lower portion thereof, said follower plate having on the upper surface thereof and said loading plate having on the lower surface thereof adjacent said respective aligned followers and holes complemental rectangular channels extending horizontally thereof, branch semi-cylindrical channels projecting therefrom to each respective follower groove, a relatively movable pin rod comprising a substantially rectangular shank contained within said channels of and hence between said follower plate and loading plate and cylindrical pin means branching therefrom fitting within said semi-cylindrical branch channels in said loading plate, and extending through said follower grooves and into said cavities, each having a rectangular sealing lug projecting downwardly from substantially the lower semi-circumference thereof terminating in a concave outer end abutting said lower follower wall and a relatively movable top multiple follower plate having similar aligned followers projecting vertically downwardly therefrom through said cooperative loading plate holes in contact with said lower followers, each having a similar cooperating molding cavity therein and semi-cylindrical groove means in the lower surface thereof diametrically of said cavity for receiving said pin means and cooperating means on said plates and rod to keep the respective cavities in alignment during the pressing operation.

7. An apparatus for use in the manufacture of spherical valves or other objects having holes therein, comprising aligned lower mold parts, each having a substantially hemi-spherical molding cavity therein and a channel in the upper surface thereof leading to said cavity from the outer surface of each lower mold part, a vertically removable common pin rod positioned adjacent said aligned lower mold parts and cavities and having branch pin means projecting therefrom through said mold channels and into said cavities, vertically superimposable similarly aligned upper mold parts each having a cooperating substantially hemi-spherical cavity therein and a channel in the lower surface thereof leading to said cavity from the outer surface of each upper mold part, said cavities in the ends of said upper and lower mold parts each having a vertically disposed dimple forming projection located centrally thereof to permit the vertical withdrawal of molded valves or other objects therefrom and a hemi-turning lug or other irregular projection forming cavity having convex side walls projecting therefrom on the abutting mold surfaces similarly aligned with a respective cavity on the opposite mold part, permitting said molded objects to be simultaneously raised from said lower mold part cavities by lifting up said common pin rod.

8. An apparatus for use in the manufacture of spherical valves or other objects having holes therein, comprising aligned lower mold parts, each having a molding cavity therein and a channel in the upper surface thereof leading to said cavity from the outer surface of each lower mold part, a vertically removable common pin rod positioned adjacent said aligned lower mold parts and cavities and having branch pin means projecting therefrom through said mold channels and into said cavities, vertically superimposable similarly aligned upper mold parts each having a cooperating molding cavity therein and a channel in the lower surface thereof leading to said cavity from the outer surface of each upper mold part, said cavities in the ends of said upper and lower mold parts each having means for molding diametrically aligned pivot elements on said object located centrally thereof to permit the vertical withdrawal of molded valves or other objects therefrom and a hemi-turning lug or other irregular projection forming cavity having side walls projecting therefrom on the abutting mold surfaces similarly aligned with a respective cavity on the opposite molded part, permitting said molded objects to be simultaneously raised from said lower mold part cavities by lifting up said common pin rod.

CHARLES H. O'KOOMIAN.